United States Patent [19]

Frestad et al.

[11] Patent Number: 4,975,406
[45] Date of Patent: Dec. 4, 1990

[54] CATALYST FOR PURIFYING EXHAUST GASES AND PREPARATION THEREOF

[75] Inventors: Arne Frestad; Sören Andersson, both of Gothenborg, Sweden

[73] Assignee: Svensk Emissionsteknik AB, Surte, Sweden

[21] Appl. No.: 317,869

[22] Filed: Mar. 2, 1989

[30] Foreign Application Priority Data

Mar. 7, 1988 [SE] Sweden ............................ 8800802

[51] Int. Cl.⁵ ..................... B01J 21/04; B01J 23/10; B01J 23/40
[52] U.S. Cl. ................................ 502/302; 502/325; 502/332; 502/334; 502/339; 423/213.5
[58] Field of Search ............ 502/334, 302, 325, 332, 502/339; 423/213.5

[56] References Cited

U.S. PATENT DOCUMENTS

| | | | |
|---|---|---|---|
| 3,901,821 | 8/1975 | Retallick | 252/410 |
| 3,931,050 | 1/1976 | Asano et al. | 252/462 |
| 4,118,199 | 11/1978 | Volker et al. | 422/171 |
| 4,128,506 | 12/1978 | Hegedus et al. | 252/466 PT |
| 4,152,301 | 5/1979 | Summers et al. | 252/466 PT |
| 4,153,579 | 5/1979 | Summers et al. | 252/462 |
| 4,237,032 | 12/1980 | Evans et al. | 502/303 |
| 4,283,308 | 8/1981 | Ohara et al. | 252/435 |
| 4,405,506 | 9/1983 | Kim | 252/462 |
| 4,492,769 | 1/1985 | Blanchard et al. | 502/262 |

FOREIGN PATENT DOCUMENTS

| | | |
|---|---|---|
| 0056729 | 7/1982 | European Pat. Off. . |
| 0091814 | 10/1983 | European Pat. Off. . |
| 0125565 | 11/1984 | European Pat. Off. . |
| 0152052 | 8/1985 | European Pat. Off. . |
| 0170841 | 2/1986 | European Pat. Off. . |
| 0262962 | 4/1988 | European Pat. Off. . |
| 50-145381 | 11/1975 | Japan ..................... 423/213.5 |
| 2000985 | 1/1979 | United Kingdom . |
| 2096482 | 10/1982 | United Kingdom . |
| 2122912 | 1/1984 | United Kingdom . |

OTHER PUBLICATIONS

Kathleen C. Taylor, "Automobile Catalytic Converters", Springer-Verlag, 1984.

*Primary Examiner*—W. J. Shine
*Attorney, Agent, or Firm*—Fred Philpitt

[57] ABSTRACT

The invention concerns a catalyst for oxidation of hydrocarbons and carbon monoxide and/or reduction of nitrogen oxides. The catalyst consists of a carrier body and on this a catalytical coating, which consists of a washcoat layer containing a support material with a high specific surface area, one or more metal oxides with a promoting effect and at least two catalytically active noble metals within the washcoat or on the washcoat. The catalytical coating consists of at least two washcoat layers containing different amounts of at least one noble metal, in such a way that at least one noble metal is concentrated to more than 50% by weight of its total amount to at least one of the layers and that at least two noble metals are contained together in at least one of the layers.

The invention also concerns a process for the preparation of said catalyst in order to obtain said layers with different composition of noble metals. The invention also concerns the use of said catalyst for purification of exhaust gases from internal combustion engines.

18 Claims, No Drawings

CATALYST FOR PURIFYING EXHAUST GASES AND PREPARATION THEREOF

The present invention relates to a catalyst for purifying exhaust gases from combustion engines by effecting oxidation of carbon monoxide and hydrocarbons in the exhaust gases simultaneously with reduction of nitrogen oxides. Catalysts of this kind are called three-way-catalysts. The invention also relates to a process for preparation of the catalyst and the use of it.

BACKGROUND

A characteristic feature in modern combustion systems is that the engine comprises an electronic control system for bringing the air-fuel-mixture into stoichiometric proportions. On condition that the fuel mixture is stoichiometric or almost stoichiometric a three-way-catalyst, which usually comprises Rh and Pt and/or Pd, is able to reduce the contents of the three kinds of impurities stated above in the exhaust gases, viz. CO, HC and $NO_x$.

These catalysts are usually constructed in such a way that a carrier body of a monolithic material with a honeycomb structure is coated with a layer, called a washcoat, which consists of:

(1) A support material with a high specific surface area, which is a refractory oxide or a mixture of refractory oxides, e.g. $Al_2O_3$, aluminium silicates, minerals from group IV B metals, mullite and clay minerals, preferably $Al_2O_3$ in the $\gamma$ form, $\delta$ form or $\sigma$ form, with a specific surface area of 70–100 $m^2/g$.

(2) One or more promoters on the surface of the support or in an intimate mixture therewith. Representatives of such promoters are oxides of the metals Sr, Ba and Ca, their aim being to stabilize the surface against sintering at high temperatures. Other additives can be $CeO_2$ and NiO, which in different ways promote the catalytic properties, e.g. by intensifying the so called water-gas-reaction or by increasing the oxygen storage capacity or by increasing the dispersion of noble metals.

Further one or more noble metals are impregnated on the surface of the support material, either simultaneously with or after the application of the washcoat. There are usually two or three noble metals, which are chosen from the group consisting of Pt, Pd and Rh.

A general description of the above mentioned technology is to be found in "Automobile catalytic converters, K. C. Taylor, Springer-Verlag, Berlin 1984". Moreover there is a number of patents describing different kinds of technology for obtaining catalysts with properties as stated above, e.g. patent application publications or patents SE 446,506, EP 91,814, SE 403,973, GB 2,122,912, EP 56,729 and SE 445,302, which describe the achievement of improved catalyst properties by using promoting additive chemicals in different ways, and further SE 429,927, which describes the achievement of improved catalyst properties by the distribution of the noble metal in a pronounced concentration gradient in the flow direction of the gases in the carrier body.

In these catalysts the noble metal component is the main catalytically active component in the catalytical reaction, and it is the principal aim of the high surface area of the support material to distribute the noble metal so as to obtain a high dispersion of noble metal, which is important for an efficient use of it.

The wording "carrier body" here implies a solid body with a rigid structure of a honeycomb type, preferably a monolith. This body is usually made of a ceramic or metallic material and has as a characterizing feature a great amount of longitudinal channels, through which the exhaust gases can flow. A typical three-way-catalyst can consist of a monolith with a volume of about 2 litres and with a coating of about 20% by weight, in which the noble metal can constitute about 2% by weight of the coating.

The wording "support material" here implies a powdered material with a high specific surface area, e.g. $Al_2O_3$ in the $\gamma$ form, $\delta$ form or $\sigma$ form, which separately or in combination with a promoter material and possibly a noble metal is applied on the carrier body, usually in the form of a slurry, which is dried and calcined.

Different automobile manufacturers use different variations of the technology described above. Further so called oxidation catalysts exist, whose purification only concerns carbon monoxide and hydrocarbons (CO activity and HC activity). These catalysts generally do not contain Rh but are similar in other respects. Moreover pellet type catalysts exist, i.e. the above mentioned chemicals are impregnated on pellets of $Al_2O_3$ with a high specific surface area, which then replace the monolithic body.

Important properties in an exhaust gas purifying catalyst are:

(1) Low ignition temperature
(2) High activity
(3) High durability

These properties are obtained with the technology described above. A high activity means that the catalyst should be highly active for different air-fuel-mixtures in the engine. The fuel ratio is stated by the so called $\lambda$ number. If $\lambda$ is $<1$ the mixture is rich and if $\lambda$ is $>1$ the mixture is lean. A stoichiometric mixture is obtained at $\lambda=1$. For three-way-catalysts the CO activity and the HC activity are high for $\lambda>1$ and low for $\lambda<1$. For $NO_x$ the reverse applies. The main aim for the electronic control system is therefore to maintain the air-fuel-mixture within a narrow "$\lambda$ window", within which the catalyst can work with a high activity concerning both CO and HC as well as $NO_x$. The oxygen storage capacity broadens this window, within which the catalyst shows a high activity.

INVENTION

According to the invention it has appeared that a considerably better performance can be achieved in comparison with conventional exhaust gas purifying catalysts if the noble metal is layered in the washcoat. The layering of noble metals can be complete or partial. In the former case at least one of the noble metals is completely separated from the others while they in the latter case are only partly separated. The explanation in theory is not entirely clear, but it is assumed that the layering emphasizes the unique properties of the different noble metals as such at the same time as a partial layering causes synergistic effects between different noble metals. It is further assumed that the reactants in the effluent gases produce a vertical concentration gradient in the washcoat and that a layered structure as above is capable of coordinating the composition of noble metals in relation to the reactant gradient in a more optimal way. The layering leads to a different gradient, because the layers are optimized for different catalytical reactions, in comparison with the case that the washcoat and the noble metal coating were homogeneous. Thus an inner layer with a certain composition can work better because of the reactant concentration being changed in a favourable way in the outer layers.

The present invention relates to a catalyst with the features stated in the claims. The catalytical coating consists of at least two washcoat layers, applied parallell to the exhaust gas flow and containing different amounts of each noble metal, in such a way that at least one noble metal is concentrated to more than 50% by weight of its total amount to at least one of the layers, and that at least two noble metals are contained together in at least one of the layers.

Exhaust gas purifying catalysts with noble metals impregnated in various steps are previously described, but such a layering as intended in the present invention has not been obtained.

Thus in U.S. Pat. No. 4,492,769 an exhaust gas purifying catalyst is described, which is prepared by the impregnation in a first step of palladium on a support and in a second step, after activation, the impregnation of palladium and a further noble metal. However, this procedure does not lead to a layering parallell to the gas flow, only that the underlying washcoat at the repeated impregnation once more is soaked and dried, i.e. a homogeneous penetration of the porous catalyst support with the impregnation solution is obtained. Thus such a stepwise impregnation of a catalyst support does not imply that a layering of the impregnated components is obtained after drying and calcination. In the catalysts according to the present invention also a treatment with a washcoat slurry in connection with each impregnation step is included, by which the intended layering is obtained.

The discussion above is applicable also to U.S. Pat. No. 4,283,308, which describes the preparation of exhaust gas purifying catalysts by a stepwise impregnation with different solutions containing one or more different noble metals, however without obtaining a layering parallell to the gas flow.

EP publication 170,841 and U.S. Pat. No. 4,405,506 describe the preparation of exhaust gas purifying catalysts by a stepwise impregnation of support particles or pellets with different noble metal containing solutions. However, this gives no layering of the noble metals, on the contrary all of them exist in the entire coating but have different gradients because of the penetration aids chosen. Thus different penetration is obtained, i.e. the metal amounts and with that the relation between the metals are varying with the depth of the layer.

EP publication 262,962 describes an exhaust gas purifying catalyst comprising two layers containing platinun in one of them and rhodium in the other one. Here, however, the entire amount of platinum is included in the inner layer and the entire amount of rhodium in the outer layer, and thus a layering in accordance with the present invention does not exist.

In a layered catalyst according to the invention said layers can more definitely contain:

(a) at least 50% by weight of a support material, preferably $Al_2O_3$ in the $\gamma$ form, $\delta$ form or $\sigma$ form, with a surface area of 50–200m$^2$/g, (b) one or more metal oxide promoters with a reaction promoting and temperature stabilizing effect, which are constituted of (in % by weight):

1–10% of alkaline earth metal oxides, 1–50% of rare earth metal oxides (such as La, Ce), 1–20% of group IV B metal oxides (such as Zr, Ti), or 1–20% of transition metal oxides (such as W, Co, Mo, Fe, Ni, Zn, Sn, Cr), (c) catalytically active noble metals in at least two of said layers, which can consist of Pt, Pd and/or Rh, in an amount not exceeding 3 by weight, calculated on the entire coating.

The layering of the noble metals is effected in such a way that one layer contains more than 50% by weight of the total amount of one noble metal and contains also another noble metal, while another layer contains the remaining amounts of the two noble metals. According to a preferred embodiment one layer contains 75–100% by weight of the total amount of Pt and contains also Rh while another layer contains the remaining amounts of Rh and Pt respectively. According to another preferred embodiment one layer contains 75–100% by weight of the total amount of Rh and contains also Pt while another layer contains the remaining amounts of Pt and Rh respectively. According to a further preferred embodiment the latter layer can then contain Pt in an amount of 50% by weight of its total amount.

The metal oxide promoter can more specifically contain (in % by weight): 1–50% of group IV B metal oxides (such as Zr, Ti), 1–5% of transition metal oxides (such as Fe, Ni, W, Co), calculated on the weight of the catalytical coating.

A specially preferred catalyst according to the invention comprises a washcoat layer, applied on a monolithic carrier body, which layer contains 50–80% by weight of a support material of $Al_2O_3$, preferably in $\delta$ form and/or $\sigma$ form, and 20–40% by weight of Ce and/or La oxides and possibly one or both of the following (in % by weight):

1–10% of group IV B metal oxides,

1–5% of transition metal oxides of Fe, Ni, Zn, Sn, Cr, W and/or Co.

A further part of the present invention is that also the washcoat can be layered. A washcoat normally contains $Al_2O_3$ with a high specific surface area plus one or more of of a number of additives, e.g.:

oxides of Ca, Ba, Sr or RE (rare earths) in order to stabilize the surface of the aluminium oxide; oxides of RE metals or group IV B metals in order to increase the oxygen storage capacity, the dispersion of the noble metals and the thermal stability of the noble metals; and/or oxides of Ni, Fe or Co in order to promote the catalytical reactions.

Thus, according to the present invention, the washcoat can be layered in such a way that e.g. one of the layers do not contain any noble metal. Then it is not necessary for this layer to contain a support material with a high specific surface area, on the contrary it can consist of only the additives as exemplified above. As this layer as such has a catalytical activity and/or a high oxygen storage capacity the concentration gradient of the reactants in the washcoat will be influenced and thus the noble metal can be more efficiently utilized.

Thus the catalyst can also comprise layers, which do not contain any noble metals, where in such layers the support can be included in a considerably lower amount than 50% by weight, comprising also 0% by weight. The remainder then consists of the promoters mentioned above. According to a preferred embodiment the catalytic coating can comprise a layer consisting of 50–100% by weight of rare earth metal oxides and 0–25% by weight of group IV B metal oxides plus 0–50 % by weight of support material. According to another preferred embodiment the catalytical coating can comprise a layer consisting of 50–100 % by weight of group IV B metal oxides and 0–25% by weight of rare earth metal oxides plus 0–50% by weight of support material.

By the layering of the washcoat and the combination of it with the layering of the noble metal, each noble metal or mixture of such metals can be combined with an optimal washcoat composition, and consequently the catalytical properties in the form of oxygen storage capacity and thermal stability can be considerably improved in comparison with presently existing catalysts on the market.

The catalysts according to the invention can be prepared in accordance with two alternative methods, the first one of which being performed as follows:

The carrier body is contacted with a washcoat slurry in water, intended for the first layer, whereafter the excess is blown off and the carrier body is heated to 350°–650° C., preferably to 500°–600° C., for drying and close-packing of the layer. Then the monolith is contacted with an aqueous solution of salts of the noble metal or metals, which are intended to be included in the first layer, whereafter heating to 350°–650° C., preferably to 500°–600° C., is performed in order to evaporate the solvent and to decompose the noble metal salt or salts. This procedure is then repeated analogously for the following one or more layers with therefor intended washcoat slurries and noble metal containing solutions, respectively. By this method the last applied noble metal will be dispersed mainly homogeneously in both layers. The layer, which possibly contains only one noble metal, therefore should be prepared as the last one.

The alternative preparation method is intended not to disperse the applied noble metal to the underlying layer. This method is performed by contacting the noble metal containing solution with the washcoat slurry, in the layer of which the noble metal or metals added are intended to exist in the catalyst ready for use, whereafter the monolith is contacted with this slurry. At this the chemical conditions first must be so chosen that the noble metal is fixed to the particles in the slurry and not remains as ions in the aqueous phase. This can be achieved in different known manners, e.g. by ion exchange fixing of a rhodium chloride complex to an $Al_2O_3$/ $CeO_2$-mixture in water.

The invention also relates to a process for the preparation of the catalyst claimed.

The invention also relates to the use of the catalyst for the purification of exhaust gases from internal combustion engines by reducing their content of carbon monoxide, hydrocarbons and nitrogen oxides.

EXAMPLE

A catalyst according to the invention was prepared in the following way (where the unit g/cubic foot is a unit accepted in connection with catalysts):

A carrier body of a monolithic material was contacted with a washcoat slurry in water, which contained 20%=$CeO_2$ on $Al_2O_3$, calculated on the complete washcoat. After drying and calcination at about 600° C. the monolith was also impregnated with a solution containing Pt and Rh. Then a new washcoat layer was applied with the same composition as the previous one with an analogous impregnation with a solution containing Rh. The total amount of washcoat pro liter catalyst ready for use was 90 g. The total amounts of Rh and Pt in the catalyst was about 8 g Rh/cuft (0,28 g Rh/l) and 21 g Pt/cuft (0,74 g Pt/l), respectively. The aluminium oxide support consisted of a mixture of the δ form and the σ form with a specific surface area of 90 $m^2$/ g before impregnation. The catalyst A thus prepared is constituted as follows:

Catalyst A:
  Layer I: 50% Rh+100% Pt
  Layer II: 50% Rh

Analogously as above a further catalyst according to the invention was prepared, which contained a total amount of 4 g Rh/cuft (0,14 g Rh/l) and 42 g Pt/cuft (1,48 g Pt/l), where the entire amount of Pt was distributed approximately equally between the two layers. The catalyst B thus prepared is constituted as follows:

Catalyst B: Layer I: 50% Pt+100% Rh
  Layer II: 50% Pt

Analogously as above three catalysts were prepared in accordance with a conventional technique. All of them contained about 90% washcoat pro liter catalyst ready for use, in which the washcoat consisted of 20% $CeO_2$ on $Al_2O_3$ (of a mixture of the δ and σ forms with a surface area of about 90 $m^2$/ g). The first catalyst contained 8 g Rh/cuft, mainly homogeneously distributed in the washcoat. The second one contained 8 g Rh/cuft and 42 g Pt/cuft, mainly homogeneously distributed in the washcoat. The third one contained about 4 g Rh/cuft and 42 g Pt/cuft, mainly homogeneously distributed n the washcoat. In table I below the different catalysts are summarized:

TABLE I

| Catalyst | Washcoat g/l | Rh g/cuft | Pt g/cuft | Layer distribution |
|---|---|---|---|---|
| A | 90 | 8 | 21 | Layer I 50% Rh + 100% Pt<br>Layer II 50% Rh |
| B | 90 | 4 | 42 | Layer I 100% Rh + 50% Pt<br>Layer II 50% Pt |
| C (comp.) | 90 | 8 | 0 | Homogeneous distr. |
| D (comp.) | 90 | 8 | 42 | Homogeneous distr. |
| E (comp.) | 90 | 4 | 42 | Homogeneous distr. |

The catalysts prepared were aged in air during 24 h at 950° C. in a conventional laboratory oven. Then their oxidizing and reducing activity for an synthetic exhaust gas mixture with the following composition was tested (in % by volume):
  0,45 % $O_2$
  0,63% CO
  600 ppm HC
  3000 ppm NO
  11% $CO_2$
  10% $H_2O$
  The balance being $N_2$ The activity was measured at a gas temperature of 400° C. when entering the catalyst. The catalyst was placed in a tube of quartz glass, through which the gas mixture was flowing. The glass tube was placed in an oven and said gas mixture thus was heated in the oven. A thermocouple was applied in the middle of the quartz glass tube about 2 cm before the inlet end of the catalyst. The energy supply to the oven was so regulated that the thermocouple showed the temperature mentioned above. About 63% of the CO content and 47% of the $O_2$ content of the gas mixture were added through separate capillary tubes just upstream of the thermocouple. The addition of these two partial flows was made by way of two magnetic valves, which successively were open during one second and closed during the next second. When the CO valve was open the O₂ valve was closed and vice versa. Thus each addition cycle was two seconds. By this arrangement a pulsating gas composition with respect to the λ value was obtained, similar to the conditions obtained by the control of the λ electronic in a car engine.

The data submitted in table II below (where NM means noble metal) refer to the conversion of the different components in the above mentioned test, measured after a steady state is reached, i.e. when the amounts of converted gas are constant. The calculation of the conversion is based on analyses of the gas mixture during the performance of the experiment, both before and after the catalyst. Thereby the following analysis methods have been used:

HC: FID (flame ionization detection)
CO: IR
NO: Chemiluminiscence

TABLE II

| Catalyst | Type of NM | Amount of NM g/cuft | g/l | Layered | Conversion at λ = 1 CO | HC | NO |
|---|---|---|---|---|---|---|---|
| A | Pt | 21 | 0,74 | 100% in I | 77 | 98 | 73 |
|   | Rh | 8 | 0,28 | 50% in I |    |    |    |
| B | Pt | 42 | 1,48 | 50% in I | 76 | 87 | 66 |
|   | Rh | 4 | 0,14 | 100% in I |   |    |    |
| C (comp.) | Pt | 0 | 0 | Not layered | 68 | 83 | 69 |
|   | Rh | 8 | 0,28 |  |   |    |    |
| D (comp.) | Pt | 42 | 1,48 | Not layered | 69 | 90 | 74 |
|   | Rh | 8 | 0,28 |  |   |    |    |
| E (comp.) | Pt | 42 | 1,48 | Not layered | 64 | 70 | 50 |
|   | Rh | 4 | 0,14 |  |   |    |    |

The data submitted in the table show that the catalysts according to the invention give a considerably higher conversion of the exhaust gas components than the catalysts according to known technique. The increased conversions are further so significant that considerable improvements are obtained in spite of the fact that the content of noble metals in catalysts A and B is considerably lower than in catalyst D. The layering in the catalysts according to the invention have influence on the conversion in different ways depending on how the layers are built up. Thus catalyst B according to the invention show a considerably better CO conversion than catalyst D in spite of half the content of Rh, and catalyst A according to the invention show a considerably better CO, HC and NO conversion than catalyst D in spite of half the content of Pt.

We claim:

1. A catalyst for treating a gas flow for the oxidation of hydrocarbons and carbon monoxide and/or the reduction of nitrogen oxides comprising a carrier body and a catalytic coating, said coating comprising at least two washcoat layers applied parallel to the gas flow, each washcoat layer comprising a support material having a high surface area and one or more metal oxide promoters and one layer containing at least one catalytically active noble metal, the amount of said at least one catalytically active noble metal being different in each washcoat layer with more than 50% by weight of the total amount of said at least one catalytically active noble metal being contained in one said layer and further wherein at least one layer contains at least two catalytically active noble metals.

2. A catalyst according to claim 1 wherein each said layer contains (a) at least 50% by weight of a support material a specific surface area of 50–200 m²/g,
    (b) one or more metal oxide promoters with a reaction promoting and temperature stabilizing effect selected from the group consisting of
       1–10% by weight of alkaline earth metal oxides,
       1–50% by weight of rare earth metal oxides,
       1–20% by weight of group IV B metal oxides, or
       1–20% by weight of oxides of metals selected from the group consisting of W, Co, Mo, Fe, Ni, Zn, Sn, and Cr, and
    (c) at least one catalytically active noble metal in an amount not exceeding 3% by weight, calculated on weight of the entire catalytic coating.

3. A catalyst according to claim 1 wherein the metal oxide promoter is constituted of: 1–50% by weight of rare earth metal oxides, and none, one of or both of the following:
    1–10% by weight of group IV B metal oxides,
    1–5% by weight of an oxide of a metal selected from the group consisting of W, Co, Mo, Fe, Ni, Zn, Sn and Cr, calculated on the weight of the entire catalytic coating.

4. A catalyst according to claim 1 wherein the noble metals are Pt and Rh and one layer contains more than 50% by weight of the total amount of Pt and also contains Rh, while another layer contains the remaining part of the total amount of the Rh and Pt.

5. A catalyst according to claim 1 wherein one layer contains 75–100% by weight of the total amount of Pt and also contains Rh, while another layer contains the remaining part of the total amount of the Rh and Pt.

6. A catalyst according to claim 1 wherein the noble metals are Pt and Rh and one layer contains more than 50% by weight of the total amount of Rh and also contains Pt, while another layer contains the remaining part of the total amount of the Pt and Rh.

7. A catalyst according to claim 1 wherein one layer contains 75–100% by weight of the total amount of Rh and also contains Pt, while another layer contains the remaining part of the total amount of the Pt and Rh.

8. A catalyst according to claim 1 wherein the different layers also contain different amounts of the metal oxide promoters.

9. A catalyst according to claim 1 wherein the support material is Al₂O₃ with a specific surface area of 50–200 m²/g.

10. A catalyst according to claim 1 wherein said catalytic coating comprises a layer of from 0 to 50% by weight of a support material with a high specific surface area, the remainder being a metal oxide promoter.

11. A catalyst according to claim 10 wherein said metal oxide promoter is constituted of 50–100% by weight of rare earth metal oxides and 0–25% by weight of group IV B metal oxides and also 0–50% by weight of a support material.

12. A catalyst according to claim 10 wherein said metal oxide promoter is constituted of 50–100% by weight of group IV B metal oxides and 0–25% by weight of rare earth metal oxides and also 0–50% by weight of a support material.

13. A catalyst according to claim 10 wherein the support material is Al₂O₃ with a specific surface area of 50–200 m²/g.

14. A catalyst according to claim 10 wherein the metal oxide promoter is one or more metal oxide with a reaction promoting and temperature stabilizing effect selected from the group consisting of 1-10% by weight of alkaline earth metal oxides,
1-50% by weight of rare earth metal oxides,
1-20% by weight of group IV B metal oxides, or
1-20% by weight of oxides of metals selected from the group consisting of W, Co, Mo, Fe, Ni, Zn, Sn, and Cr.

15. A process for the preparation of the catalyst of claim 1 wherein the layered structure of the catalyst is built up by a sequential coating of a carrier body which includes the steps of:
  (1) contacting the carrier body with a washcoat slurry,
  (2) contacting the product obtained in step (1) with a solution containing one or more noble metals, and
  (3) applying one or more further layers with another noble metal composition or without a noble metal in analogy with steps (1) and (2).

16. A process for the preparation of the catalyst of claim 1 wherein the layered structure of the catalyst is built up by a sequential coating of a carrier body which includes the steps of:
  (1) contacting a washcoat slurry with a solution containing one or more noble metals,
  (2) contacting a carrier body with the noble metal treated washcoat obtained in step (1), and
  (3) applying one or more further layers with another noble metal composition or without a noble metal in analogy with steps (1) and (2).

17. In an automotive catalytic converter comprising a catalyst of a carrier body coated with a washcoat, the improvement which comprises using as the catalyst, the catalyst of claim 1.

18. In an automotive catalytic converter comprising a catalyst of a carrier body coated with a washcoat. The improvement which comprises using as the catalyst, the catalyst of claim 10.

* * * * *